United States Patent [19]

Drozdyk

[11] Patent Number: 5,780,375
[45] Date of Patent: Jul. 14, 1998

[54] THICK FILM COMPOSITION FOR MODIFYING THE ELECTRICAL PROPERTIES OF A DIELECTRIC LAYER

[75] Inventor: Lorri Potvin Drozdyk, Hillsborough, N.C.

[73] Assignee: E. I. du Pont de Nemours and Company, Wilmington, Del.

[21] Appl. No.: 671,868

[22] Filed: Jun. 28, 1996

Related U.S. Application Data

[63] Continuation-in-part of Ser. No. 635,796, Apr. 22, 1996, abandoned, which is a continuation of Ser. No. 510,923, Aug. 3, 1995, abandoned, which is a continuation of Ser. No. 335,520, Nov. 7, 1994, abandoned, which is a continuation of Ser. No. 139,360, Oct. 19, 1993, abandoned.

[51] Int. Cl.$^6$ .................................................. C04B 35/46
[52] U.S. Cl. ....................... 501/137; 501/32; 501/138; 501/139; 361/320; 361/321.1; 361/321.5
[58] Field of Search ............................... 501/17, 18, 26, 501/32, 137, 138, 139, 136, 10; 361/305, 320, 321.1, 321.5, 311, 312

[56] References Cited

U.S. PATENT DOCUMENTS

| | | | |
|---|---|---|---|
| H416 | 1/1988 | Colvin | 361/306.2 |
| 3,878,443 | 4/1975 | Girard et al. | 501/138 |
| 3,968,412 | 7/1976 | Girard et al. | 501/32 |
| 4,020,536 | 5/1977 | Cuttill et al. | 361/311 |
| 4,101,952 | 7/1978 | Burn | 361/305 |
| 4,349,562 | 9/1982 | Bajorek et al. | 361/762 |
| 4,447,855 | 5/1984 | Lagrange | 501/136 |
| 4,567,542 | 1/1986 | Shimeda et al. | 361/321.4 |
| 4,613,648 | 9/1986 | Usala | 524/555 |
| 4,640,905 | 2/1987 | Burn | 501/137 |
| 4,654,095 | 3/1987 | Steinberg | 156/89 |
| 4,766,027 | 8/1988 | Burn | 428/210 |
| 4,845,062 | 7/1989 | Burn | 501/138 |
| 4,853,827 | 8/1989 | Hernandez | 361/321.4 |
| 4,898,844 | 2/1990 | Maher et al. | 501/137 |
| 5,024,795 | 6/1991 | Kennedy et al. | 264/59 |
| 5,055,966 | 10/1991 | Smith et al. | 361/321.3 |
| 5,085,720 | 2/1992 | Mikeshu et al. | 156/59 |
| 5,185,690 | 2/1993 | Miller | 361/321.2 |
| 5,396,397 | 3/1995 | McClanahan et al. | 361/313 |
| 5,428,499 | 6/1995 | Szerlip et al. | 361/328 |

OTHER PUBLICATIONS

Cussow R.O "Internal Capacitors and Resistors for Multi Layer Ceramic Modules" IBM Tech. Dis. Bull. vol. Feb. 1978, pp. 3436, 3437.

*Primary Examiner*—Michael Marcheschi

[57] ABSTRACT

The invention is directed to a capacitor dielectric thick film composition comprising, by weight %: (1) 32–98% $BaTiO_3$, (2) 2–60% zinc barium borate and (3) 0–8% $Bi_2O_3$.

6 Claims, No Drawings

THICK FILM COMPOSITION FOR MODIFYING THE ELECTRICAL PROPERTIES OF A DIELECTRIC LAYER

CROSS REFERENCE TO RELATED APPLICATIONS

This application is a continuation-in-part of Ser. No. 08/635,796 filed Apr. 22, 1996 now abandoned application which is a continuation of Ser. No. 08/510,923 filed Aug. 3, 1995 now abandoned application which is a continuation of Ser. No. 08/335,520 filed Nov. 7, 1994 now abandoned application which is a continuation of Ser. No. 08/139,360 filed Oct. 19, 1993 now abandoned application.

FIELD OF THE INVENTION

This invention relates to a thick film composition used for various capacitor processing methods.

BACKGROUND OF THE INVENTION

A common method of fabricating compact, complex electronic circuits is to build a multilayer structure of conductive layers separated by insulating ceramic dielectric layers. The unfired ceramic dielectric layers, with thick film conductor patterns printed and interconnected by metallized vias through the dielectric layers, are cofired together. Components, such as capacitors, are typically mounted on the surface of the cofired part, occupying valuable surface space. Integration of these components into the cofired multilayer structure would be of benefit from not only a density standpoint, but also from a processing and cost standpoint.

Use of silver as the metallization in multilayer circuits provides the advantages of low cost and high conductivity. However, the silver melting temperature of 961° C. necessitates a lower firing temperature for silver multilayer circuits. Typically multilayer circuits containing silver metallization are fired at 850° C.

In order to integrate capacitors into the multilayer structure, the capacitor dielectric must have shrinkage compatibility with the metallization and multilayer dielectric. Without shrinkage compatibility, a Low Temperature Cofired Ceramic (LTCC) part will display distortion which renders the circuit useless. High dielectric constant (K) material such as $BaTiO_3$ is normally sintered at >1250° C., and frit or a flux must be combined with $BaTiO_3$ in order to promote shrinkage at 850° C. The addition of frit to a $BaTiO_3$ material degrades the dielectric properties of the fired dielectric, and in particular it decreases the dielectric constant of the fired dielectric, with the extent of degradation in K dependent on the frit composition. Typical frits combined with $BaTiO_3$ material at levels which promote the desired shrinkage at 850° C., result in unacceptable degradation in the dielectric constant.

In U.S. Pat. No. 4,640,905, $BaTiO_3$ based compositions containing Mn-doped zinc borate frits [F], according to the formula,

$$(1-x)[Ba_{1-z}Pb_z(Ti_{1-(u+v)}Zr_uSn_v)O_3]+X[AZ_{1/3}Nb_{2/3}]+Y[F]$$

with A selected from Pb and Ba. The Mn-doped zinc borate frit, with a zinc/boron atomic ratio of 2–4, and with up to 50 mole % of the $B_2O_3$ replaced by $SiO_2$, $GeO_2$ or $Al_2O_3$, in the compositions is also disclosed, in addition to a manganese-doped zinc borate frit containing BaO. The frit level (Y) of 1–5 weight % sufficiently affected densification at firing temperatures of 1000°–1150° C. and allowed the use of 70 silver/30 palladium electrodes.

In U.S. Pat. No. 4,845,062, zinc borate frit is disclosed, with a zinc/boron atomic ratio of 1–3, containing BaO at a level of 1–5 weight %, and up to 50 mole % $B_2O_3$ replaced by $Al_2O_3$. In $MgTiO_3$-based compositions, frit levels of 5–10 weight % were used to affect densification at 1000°–1150° C. and allow the use of 70 silver/30 palladium electrodes. The compositions resulted in dielectric constants ranging 18–23, and were useful for high frequency applications requiring a dielectric constant around 20.

There is a need in the industry for high K dielectric compositions which shrink during firing at 850° C. to allow the use of silver metallization, and which result in K>100. The present invention discloses dielectric compositions based on $BaTiO_3$, with $2ZnO$—$BaO$—$B_2O_3$ frit which is alumina-free. It has been found that the addition of $2ZnO$—$BaO$—$B_2O_3$ frit to $BaTiO_3$ promotes shrinkage during firing which leads to less degradation in dielectric constant compared with other frits.

SUMMARY OF THE INVENTION

The invention is directed toward a capacitor dielectric thick film composition comprising, by weight %: (1) 32–98% $BaTiO_3$, (2) 2–60% zinc barium borate and (3) 0–8% $Bi_2O_3$.

DETAILED DESCRIPTION OF THE INVENTION

The compositions of the present invention can be used with typical various capacitor processing methods including high K tape insert arrays, paste via fill arrays, high K tape inserts or screen printing for integrated capacitors in multilayer circuits. The different processing methods have different capacitor dielectric shrinkage requirements, and therefore necessitate various compositions of the invention (variation of frit content). In addition, different multilayer systems of materials (multilayer dielectric and metallizations) have different shrinkage characteristics, which require various compositional ranges of the invention. The compositions shrink during firing at about 850° C., and shrinkage characteristics are such that low porosity, and volume shrinkage and shrinkage rate compatibility with LTCC system materials, are obtained for good capacitor electrical properties and low part distortion and surface topography of LTCC multilayer circuits.

The compositions described herein may also be used as plugs inserted into a green dielectric sheet. Holes for the plugs are formed in the sheet in a step prior to insertion of the plugs or in the same step. Methods for via formation in dielectric sheets, such as mechanical punching, laser drilling, chemical etching and photoforming are suitable for making holes for the plugs. Plugs can be inserted by known via fill methods including screen printing thick film paste into the holes or mechanically punching the desired plug, in sheet form, into the existing holes. Alternatively, holes may be not preformed in the dielectric sheet. The desired plug, in sheet form, can be mechanically punched into the untreated dielectric sheet, displacing the corresponding material of the dielectric sheet in the same stroke. Each plug may completely or partially fill its respective hole depth. Generally, the plugs will range from 2 mils to 100 mils in diameter or on the diagonal, depending upon the shape. As the size of the plugs decreases, stresses caused by TCE mismatches are reduced. For sufficently small areas, the stress is below the critical stress for cracking and greater TCE mismatches can be accomodated.

The plugs can be located anywhere in the dielectric layer and when there are more than one, they can be arranged in any desired configuration. For a single component like a capacitor, a preferred configuration is an array wherein a plurality of plugs are arranged in a regular, repeating pattern. For a single dielectric sheet involving more than one component, multiple such patterns may be employed.

In a multilayer interconnect, one or more of the altered dielectric sheets may be used depending upon the nature and number of buried components. For each component, each side of the altered sheet contacts an electrode composition in the area of the plugs for that component. The plugs and surrounding matrix dielectric are electrically connected in parallel effectively altering the electrical properties of the matrix dielectric composition. When a plug does not completely fill its respective hole, electrode composition can fill any remaining space between the plug and the surface of the dielectric sheet. However, electrode composition should not penetrate into the plug hole beyond the surface of the plug material.

To sandwich a plug configuration between two electrodes, an electrode composition such as a thick film conductive paste, can be applied to each side of dielectric sheet covering the plugs and the surrounding matrix dielectric sheet. The electrode can be a single, continuous pad covering both plugs and matrix dielectric or the electrode can be a pattern of small pads which cover both a plug and some surrounding matrix dielectric and are connected by trace conductor lines.

The assembly of dielectric and electrodes can be stacked in registry with the other layers of the interconnect, laminated into a monolith and subsequently fired. Alternatively, the conductor composition can be applied to the adjacent dielectric sheets which are then stacked in registry with the altered sheet and any other layers of the interconnect. Or, the conductor composition can be in the form of a sheet which is stacked in registry with and adjacent to the altered sheet.

The various layers of the monolith can be assembled and fired by known methods including for example pressure assisted firing as described in U.S. Pat. No. 5,085,720. Preferably, the monolith is cofired. Firing temperatures ranging from 800°–2000° C. are suitable depending upon the nature of the compositions in the monolith.

The foregoing description focuses on the invention using dielectric sheets, a preferred embodiment. Conventional methods for use of the thick film compositions can also be used. For example, a thick film composition of the present invention can be screen printed with the appropriate hole(s) in registry with an electrode, and then fired. The thick film composition may have altered electrical properties is screen printed in registry with the plug hole(s) and the composite is fired. Then another electrode composition is screen printed in registry with the plug(s).

The preferred composition of a capacitor dielectric is dependent on the processing method and on the multilayer system of materials (multilayer dielectric and metallizations), and associated requirements for shrinkage characteristics. For example, compositions which are preferred for screen printed capacitors in a low temperature cofired ceramic (LTCC) tape structure, must have shrinkage rate similar to the LTCC materials system for reduced part distortion, such as:

| | |
|---|---|
| BaTiO3 | 32–92 weight % |
| Zinc barium borate Frit | 8–60 weight % |
| Bi2O3 | 0–8 weight % |

Compositions which are preferred for large area (e.g. 250 mil diameter) high K inserts or plugs, must have a sufficient frit content for reduced porosity and shrinkage rate similar to the multilayer system for reduced part distortion, with volume shrinkage requirements limiting the frit content for reduced part distortion, such as:

| | |
|---|---|
| BaTiO3 | 42–96 weight % |
| Zinc barium borate Frit | 4–50 weight % |
| Bi2O3 | 0–8 weight % |

Compositions which are preferred for small area (e.g. 15 mil diameter) high K inserts or plugs, must have a sufficient frit content for reduced porosity, with volume shrinkage requirements limiting the frit content for microstructural integrity, such as:

| | |
|---|---|
| BaTiO3 | 52–98 weight % |
| Zinc barium borate Frit | 2–40 weight % |
| Bi2O3 | 0–8 weight % |

The frit preferred in the above compositions is $2ZnO$—$BaO$—$B_2O_3$. Although a second frit may be added to further regulate shrinkage and dielectric constant (K).

EXAMPLES

Examples 1–5 (Comparative)

| EXAMPLE | 1 | 2 | 3 | 4 | 5 |
|---|---|---|---|---|---|
| Weight % in Inorganics: | | | | | |
| BaTiO$_3$ | 80 | 70 | 80 | 70 | 80 |
| Frit | 20 | 30 | 20 | 30 | 20 |
| Type Frit | BaAlZnBorate | BaAlZnBorate | Frit A | Frit A | Frit B |
| Dielectric Constant, K | 194 | 137 | 88 | 47 | 33 |
| D.F. (%) | 1.3 | 1.1 | 15.3 | 5.5 | 10 |

Dielectric materials in Examples 1–5 were prepared by forming thick film pastes consisting of BaTiO$_3$ and frit, dispersed in a suitable organic medium. The pastes were screen printed on alumina substrates, to form parallel plate capacitors using DuPont 6160 (Ag conductor composition with minor amount of inorganic binder) silver electrodes. The parts were fired at 850° C. Different frits resulted in different dielectric constant and dissipation factor (D.F.) values. For a fixed frit content with BaTiO$_3$, the 6ZnO-3BaO-2B$_2$O$_3$—Al$_2$O$_3$ frit (BaAlZnBorate) resulted in the greatest dielectric constant, whereas frit A and frit B (Table 1) resulted in substantially greater degradations in dielectric constant and dissipation factor.

TABLE 1

| Frit A: | Weight % | Frit B: | Weight % |
|---|---|---|---|
| SiO$_2$ | 38.52 | SiO$_2$ | 57.42 |
| Al$_2$O$_3$ | 3.82 | PbO | 16.68 |
| BaO | 8.48 | B$_2$O$_3$ | 4.48 |
| SrO | 3.88 | Al$_2$O$_3$ | 8.93 |
| CaO | 9.88 | Na$_2$O | 2.53 |
| ZnO | 30.49 | K$_2$O | 1.68 |
| ZrO$_2$ | 4.92 | CaO | 7.44 |
| | | MgO | 0.84 |

Examples 6–7

| EXAMPLE | 6 | 7 |
|---|---|---|
| Weight % in Inorganics: | | |
| BaTiO$_3$ | 85 | 69.5 |
| Frit | 15 | 30.0 |
| Bi$_2$O$_3$ | 0 | 0.5 |
| Type Frit | 6ZnO—3BaO—2B$_2$O$_3$—Al$_2$O$_3$ | 2ZnO—BaO—B$_2$O$_3$ |
| Dielectric Constant, K | 800 | 440 |
| D.F. (%) | 1.1 | 1.6 |
| HALT Reliability (200 V, 150° C. | Failure <10 hours | No Failure >100 hours |

Examples 6 and 7 represent BaTiO$_3$-based dielectrics with barium-zinc-borate frit which contains alumina and which is alumina-free, respectively. For Example 6, slip consisting of 15 weight % of 6ZnO-3BaO- 2B$_2$O$_3$,—Al$_2$O$_3$ frit with BaTiO$_3$, dispersed in a suitable medium, was prepared and tape was cast. Multilayer capacitors were formed by screen printing silver electrodes on the tape, laminating with additional tape layers, firing at 925° C., and terminating with silver paste which was fired at 750° C. For example 7, dielectric paste consisting of 30 weight % 2ZnO—BaO—B$_2$O$_3$, with BaTiO$_3$ and a small amount of Bi$_2$O$_3$, dispersed in a suitable organic medium, was prepared. The dielectric paste was screen printed with silver capacitor electrodes on DuPont 951 GREEN TAPE (E.I. duPont de Nemours and Co., Wilmington, Del., 951 GREEN TAPE™ which is a 0.5 μm alumina particle-filled crystallizable glass material firable at 850°–875° C. and having a dielectric constant of 8), laminated with additional 951 GREEN TAPE layers, and fired at 875° C. As expected, the dielectric constant for example 7 was lower than example 6 due to the higher frit content.

The important feature demonstrated by examples 6 and 7 is the lack of failure after highly accelerated life testing (HALT) at 200V/150° C. for example 7 due to the absence of alumina in the frit.

Examples 8–11

| EXAMPLES | 8 | 9 | 10 | 11 |
|---|---|---|---|---|
| Weight % in Inorganics: | | | | |
| BaTiO$_3$ | 95.0 | 69.5 | 69.5 | 52.5 |
| 2ZnO—BaO—B$_2$O$_3$ Frit | 0 | 30.0 | 30.0 | 47.0 |
| Bi$_2$O$_3$ | 5 | 0.5 | 0.5 | 0.5 |
| K | 460 | 470 | 450 | 185 |
| D.F. (%) | 1.1 | 1.8 | 1.8 | 2.9 |
| Surf Top. of Part (μm) | 740 | 35 | 24 | 9 |
| Layers of Green Tape | 4 | 4 | 8 | 8 |
| Fired Diel. Thickness (μm) | 43 | 39 | 39 | 39 |
| Area Diel. (mil) | 135 × 135 | 105 × 105 | 105 × 105 | 105 × 105 |

The importance of shrinkage rate for a capacitor dielectric cofired in a multilayer structure is demonstrated in examples 8–11. The variation in local surface topography for a fired multilayer must be small in order to accomodate surface mounting. A primary condition for the meeting of the surface flatness requirement is the close match in X-Y shrinkage rate between the capacitor dielectric and the substrate green tape and conductor. For greater mismatch in shrinkage rate, which can be controlled by the type and amount of frit in the capacitor dielectric, greater surface topography will result.

Capacitor dielectric pastes were formulated, based on BaTiO$_3$ and 2ZnO—BaO—B$_2$O$_3$ frit, which begin to shrink at about 800° C.

For examples 8–11, capacitors were produced by screen printing the dielectric pastes with DuPont 6142 silver electrodes on 951 GREEN TAPE™ sheets, followed by lamination of two such sheets with capacitor dielectric in contact, between either 2 or 4 additional 951 GREEN TAPE™ layers on each side, and cofiring at 850° C. Surface variation was determined using a mechanical surface profilometer.

In Example 8, a paste which contained no frit, and consequently had very little shrinkage, was evaluated in a capacitor. Although the dielectric contained 5 weight % Bi$_2$O$_3$, little firing shrinkage occurred. The dielectric constant is 460, which is low for a primarily BaTiO$_3$ body, due to the dielectric's high porosity and flow of glass from the 951 GREEN TAPE™ into the capacitor dielectric. The surface topography is very large due to the distortion produced as a consequence of the mismatch in shrinkage between the capacitor dielectric and the 951 GREEN TAPE™ and 6142D.

In order to improve the surface topography, the capacitor dielectric was formulated to shrink during cofiring by inclusion of 30.0 weight % frit, as indicated in Example 9. The frit causes the capacitor dielectric to shrink during cofiring, and hence the distortion produced by the shrinkage mismatch, and consequently the surface topography, is reduced. The inclusion of Bi$_2$O$_3$ promotes little if any shrinkage, and is included in the compositions for a minor enhancement of the dielectric constant. An increase in the number of tape layers for the monolith in which the capacitor is buried, from 4 to 8 layers, resulted in a slight decrease in the surface topography, as exhibited in Example 10.

The effect of increased frit content in the capacitor dielectric formula is given in Example 11. A decrease in the surface topography is evident, which is due to greater similarity in shrinkage rate (or temperatures at which shrinkage occurs) during cofiring of the capacitor dielectric and the 951 GREEN TAPE™ and 6142D conductor. The dielectric constant is reduced due to the dilution effect of a greater frit content in the capacitor dielectric. The shrinkage rate for the capacitor dielectric and 951 GREEN TAPE™ is closely matched for a frit 2ZnO—BaO—B$_2$O$_3$ frit level of 47.0 weight % in the capacitor dielectric, resulting in low distortion. The surface topography of 9 μm is primarily due to the additional thickness associated with the capacitor dielectric and electrodes buried in the multilayer.

The capacitor dielectric formulations are suitable for screen printed capacitors buried in a cofired multilayer tape structure. The optimal frit content is dependent on the surface topography requirement and the desired dielectric constant. The frit content in the capacitor dielectric which is necessary for the maximum surface flatness is dependent on the substrate dielectric X-Y shrinkage rate.

Examples 12–16

| EXAMPLES | 12 | 13 | 14 | 15 | 16 |
|---|---|---|---|---|---|
| Weight % in Insert Inorganics: | | | | | |
| BaTiO$_3$ | 59.5 | 69.5 | 69.5 | 92.5 | 96.0 |
| 2ZnO—BaO—B$_2$O$_3$ Frit | 40.0 | 30.0 | 30.0 | 7.0 | 0.0 |
| Bi$_2$O$_3$ | 0.5 | 0.5 | 0.5 | 0.5 | 0.4 |
| Volume Shrinkage, Insert (%) | 52 | 44 | 44 | 23 | 0.5 |

-continued

| EXAMPLES | 12 | 13 | 14 | 15 | 16 |
|---|---|---|---|---|---|
| Volume Shrinkage, Peripheral Sheet (%) | 32 | 32 | 32 | 32 | 32 |
| K | 317 | 500 | 500 | 772 | 576 |
| D.F. (%) | 1.6 | 2.1 | 2.1 | 1.4 | 1.2 |
| I.R. (GΩ) | 1180 | 340 | 340 | 1045 | 2540 |
| BDV (V) | 600 | 650 | 650 | 350 | 400 |
| Surface Topography | | | | | |
| Top of Part (μm) | 14 | 13 | 13 | 17 | 30 |
| Bottom of Part (μm) | 28 | 16 | 13 | 28 | 62 |
| Layers of Tape | 5 | 5 | 9 | 9 | 9 |
| Insert Tape Unfired Thickness (μm) | 118 | 118 | 18 | 130 | 126 |
| Peripheral Tape Unfired Thickness (μm) | 114 | 114 | 114 | 114 | 114 |

In examples 12–16, capacitors were produced by forming high K tape inserts measuring 250 mil×250 mil in a dielectric tape sheet. Slips consisting of 2ZnO—BaO—$B_2O_3$ frit, $Bi_2O_3$ and $BaTiO_3$, in proportions indicated in the Table 4 and dispersed in a suitable medium, were prepared and tapes were cast. Capacitors were formed by forcing high K tape material from a high K tape sheet into a previously punched hole in the 951 GREEN TAPE™, using mechanical via punch equipment. DuPont 6142 silver conductor paste electrodes measuring 200 mil×200 mil were then screen printed on each side of the insert. The assembly was laminated between either 2 or 4 additional 951 GREEN TAPE™ layers on each side. The 5 and 9 layer monoliths were each cofired at 850°–875° C.

In Example 12, a material consisting of 40 weight % frit with $BaTiO_3$ was used as the insert, which resulted in a dielectric constant of 317 for the buried capacitor. The dissipation factor (D.F.), insulation resistance (I.R.), and breakdown voltage (BDV) values are favorable. The volume shrinkage of the insert is considerably greater than the 951 GREEN TAPE™, and the resultant difference in fired thickness between the insert and its surrounding sheet is evidenced as a depression in the part surface where the capacitor insert is buried. For insert material (of geometry 250 mil×250 mil) with greater volume shrinkage compared with the peripheral layer, as in Example 12, the excess shrinkage of the insert material occurs mainly in the z direction which results in surface topography above and below the buried capacitor.

In order to improve the surface topography, the volume shrinkage of the insert material was reduced by decreasing the frit content, as indicated in Example 13. This decreased frit content led to an increase in dielectric constant, in addition to a decrease in the surface topography.

The effect of a further modification of the insert formulation, by decrease in the frit content, is given in Example 15. The dielectric constant for the capacitor dielectric in Example 15 increased, compared with Example 14 with a higher frit content. The volume shrinkage of the insert is less than the peripheral tape shrinkage. However, the decrease in frit content of the insert material led to a greater mismatch in shrinkage rate (or temperatures at which shrinkage occurs) during cofiring of the insert material and the peripheral material, and consequently greater degradation of the surface topography.

Example 16 included an insert material which contained no frit, resulting in very little shrinkage. The $Bi_2O_3$ included in the composition promotes only a very minor degree of shrinkage. This great difference in shrinkage characteristics between the insert and peripheral materials resulted in even greater distortion and surface topography than Example 15. The dielectric constant for the capacitor generally increases with decrease in frit content in the insert dielectric. However, the dielectric constant for the capacitor dielectric in Example 16 was less than that for insert dielectrics with frit (Example 15), which was associated with the increase in porosity for the dielectric insert in Example 16 due to the absence of frit and resultant low firing shrinkage. Frit must be included in $BaTiO_3$-based compositions fired at 850° C., in order to significantly affect shrinkage.

Examples 17–18

| EXAMPLES | 17 | 18 |
|---|---|---|
| Weight % in Plug Inorganics: | | |
| $BaTiO_3$ | 69.5 | 91.0 |
| 2ZnO—BaO—$B_2O_3$ Frit | 30.0 | 7.5 |
| $Bi_2O_3$ | 0.5 | 1.5 |
| Volume Shrinkage, Plug (%) | 44 | 27 |
| Volume Shrinkage, Matrix (%) | 32 | 32 |
| K of Isolated Plug Dielectric | 790 | 1350 |
| K of Composite Dielectric | 230 | 370 |
| D.F. (%) | 1.8 | 1.2 |
| Composite Dielectric Fired Microstructure | Poor | Good |

In Examples 17–18, capacitors were produced by forming an array of high K tape inserts (or plugs) 15 mil in diameter in a dielectric sheet. Slips consisting of 2ZnO—BaO—$B_2O_3$ frit, $Bi_2O_3$ and $BaTiO_3$, in proportions indicated in the Table 5 and dispersed in a suitable medium, were prepared and tapes were cast. Capacitors were formed by mechanically punching the high K tape into a previously punched array of holes in the 951 GREEN TAPE™. For each capacitor, a 10×10 array of 115 μm thick plugs was inserted into 115 μm 20 thick matrix tape. The high K plug diamater was 15 mil, and plugs were arranged in a close-pack array with a center-to-center distance of 20 mils, which resulted in a ratio area high K plug/area low K matrix of 0.44/0.56 between the electrodes. DuPont 6142 silver conductor paste was then screen printed over a composite capacitor dielectric area measuring 200 mil×200 mil, and the 951 GREEN TAPE™ with high K plug array was laminated between additional 951 GREEN TAPE™ layers. The monolith was cofired at 875° C.

In Example 17, the dielectric constant of the composite dielectric (K=230) was less than the value expected based on the geometry of high K plugs (K=790 for isolated plugs) and low K matrix (K=8) connected in parallel between the electrodes, due to a dilution effect of frit from the 951 tape matrix flowing into the high K plug. For plug material (of geometry 15 mil diameter) with greater volume shrinkage during firing compared with the matrix material, as in Example 17, the excess shrinkage of the plug material occurs in the x-y directions as well as in the z direction. This results in poor fired microstructure for the composite dielectric due to the fired plugs not completely filling the space of the matrix holes in the fired multilayer.

Modification of the high K dielectric plug formulation, in order to decrease the shrinkage to slightly below the volume shrinkage of the matrix material, resulted in a plug which filled the space in the holes of the matrix dielectric sheet in the fired multilayer. The plug material in Example 18 has a greater K than in Example 17 due to lower frit content, and consequently resulted in a composite dielectric with higher dielectric constant.

TEST DESCRIPTION

HALT (Highly Accelerated Life Test) description:

Dielectric performance under voltage bias was determined by measuring current leakage at 150° C. with 200 V applied, for up to 100 hours. Current flow through individual capacitors was determined at repeated time intervals by measuring the voltage across a $10^5$ ohm resistor in series with the capacitor. The current leakage of the capacitor was monitored during testing, and the number of failures (defined as a short) or mean time to failure was determined. This test was designed to accelerate any degradation process which might lead to failure of the capacitor in use, and is a technique commonly used for testing MLC's.

A reference for further description of HALT testing is:

R. Munikoti and P. Dhar, "Higly Accelerated Life Testing (HALT) for Multilayer Ceramic Capacitor Qualification", IEEE Trans. Comp. Hybr. and Manufact. Tech., 11, (4), 342–345 (1988).

What is claimed is:

1. A capacitor dielectric thick film composition comprising, by weight percent: (1) 32–98% $BaTiO_3$, (2) 2–60% zinc barium borate frit consisting of the oxides of zinc, barium and boron, and (3) 0–8% $Bi_2O_3$.

2. A composition of claim 1 comprising, by weight %: (1) 32–92% $BaTiO_3$, (2) 8–60% zinc barium borate frit and (3) 0–8 wt. % $Bi_2O_3$.

3. A composition of claim 1 comprising, by weight %: (1) 42–96% $BaTiO_3$, (2) 4–50% zinc barium borate frit and (3) 0–8 wt. % $Bi_2O_3$.

4. A composition of claim 1 comprising, by weight %: 52–98% $BaTiO_3$, (2) 2–40% zinc barium borate frit and (3) 0–8 wt. % $Bi_2O_3$.

5. A composition as in any one of claims 1, 2, 3 or 4, in which the weight % of $Bi_2O_3$ is about 0.5–5%.

6. A composition as in any one of claims 1, 2, 3 or 4, in which the zinc barium borate frit is $2ZnO\ BaO\ B_2O_3$.

* * * * *